(12) United States Patent
Saito et al.

(10) Patent No.: US 11,967,809 B2
(45) Date of Patent: Apr. 23, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/989,397

(22) Filed: Nov. 17, 2022

(65) Prior Publication Data

US 2023/0170678 A1     Jun. 1, 2023

(30) Foreign Application Priority Data

Nov. 26, 2021 (JP) .................. 2021-192261

(51) Int. Cl.
    *H02G 3/04*      (2006.01)
    *B60R 16/02*     (2006.01)
    *H02G 3/32*      (2006.01)

(52) U.S. Cl.
    CPC ....... *H02G 3/0456* (2013.01); *B60R 16/0215* (2013.01); *H02G 3/32* (2013.01); *B60R 16/0207* (2013.01)

(58) Field of Classification Search
    CPC ............ B60R 16/0207; B60R 16/0215; H01B 7/0045; H02G 3/04; H02G 3/30; H02G 3/0418; H02G 3/0462; H02G 3/0481
    USPC ................................. 248/68.1, 73, 74.1–74.4
    See application file for complete search history.

(56) References Cited

U.S. PATENT DOCUMENTS

| 7,100,641 | B2* | 9/2006 | Tyrer | H02G 3/0481 |
| | | | | 138/158 |
| 7,546,986 | B2* | 6/2009 | Kim | F16L 3/1008 |
| | | | | 248/62 |
| 7,740,211 | B2* | 6/2010 | Dukes | H02G 1/08 |
| | | | | 248/74.1 |
| 7,770,848 | B2* | 8/2010 | Johnson | F16L 3/1207 |
| | | | | 248/65 |
| 2007/0128929 | A1* | 6/2007 | Oga | F16L 3/1025 |
| | | | | 439/578 |
| 2008/0105796 | A1* | 5/2008 | Nix | B60R 16/0215 |
| | | | | 248/74.1 |
| 2014/0131528 | A1* | 5/2014 | Blakeley | H02G 3/32 |
| | | | | 248/74.2 |
| 2016/0049777 | A1* | 2/2016 | Anselmo | H01L 31/00 |
| | | | | 248/49 |
| 2019/0089142 | A1 | 3/2019 | Sugino | |
| 2020/0274343 | A1 | 8/2020 | Sugino | |

FOREIGN PATENT DOCUMENTS

JP       2019-053894 A      4/2019

* cited by examiner

*Primary Examiner* — Paresh Paghadal
(74) *Attorney, Agent, or Firm* — Oliff PLC

(57) ABSTRACT

A wire harness including: a wire harness body that includes an electric wire and an outer sheath configured to cover an outer circumference of the electric wire; a first route regulator that is to be attached to an outer circumference of the outer sheath and is configured to regulate a route of the wire harness body; and a fixing member configured to fix the first route regulator to an attachment target.

20 Claims, 6 Drawing Sheets

WIRE HARNESS

BACKGROUND

The present disclosure relates to a wire harness.

There is a conventional vehicle wire harness that includes a wire harness body having an electric wire member and an outer sheath member covering the electric wire member, and a route regulating member that is attached to the outer circumference of the outer sheath member to regulate the route of the wire harness body (see JP 2019-53894A, for example). The wire harness described in JP 2019-53894A includes a clamp for fixing the route regulating member to the vehicle body. The clamp has a holding part that holds the route regulating member so as to cover the entire circumference of the route regulating member and a fixing part that is fixed to the vehicle body.

SUMMARY

In the wire harness as described above, the route regulating member is attached to the outer circumference of the outer sheath member covering the electric wire member, and the holding part of the clamp is attached to the route regulating member so as to cover the entire circumference of the route regulating member. Thus, there is the issue of an increase in the outer dimensions of the wire harness in a radial direction at the attachment portion of the clamp.

An exemplary aspect of the disclosure provides a wire harness that can be downsized in a radial direction at the attachment portion of a fixing member.

A wire harness in the present disclosure includes: a wire harness body that includes an electric wire and an outer sheath configured to cover an outer circumference of the electric wire; a first route regulator that is to be attached to an outer circumference of the outer sheath and is configured to regulate a route of the wire harness body; and a fixing member configured to fix the first route regulator to an attachment target, wherein: the first route regulator includes: an insertion inlet that is open in a direction orthogonal to a length direction of the first route regulator and extends over an entire first route regulator in the length direction; and a first coupling that is partially provided in a circumferential direction of the first route regulator, and the fixing member includes: a fixing part that is to be fixed to the attachment target and a second coupling that is to be coupled to the first coupling.

According to the wire harness in the present disclosure, it is possible to downsize the wire harness in the radial direction at the attachment of the fixing member.

DETAILED DESCRIPTION OF EMBODIMENTS

Description of Embodiments of Present Disclosure

Figure 1:
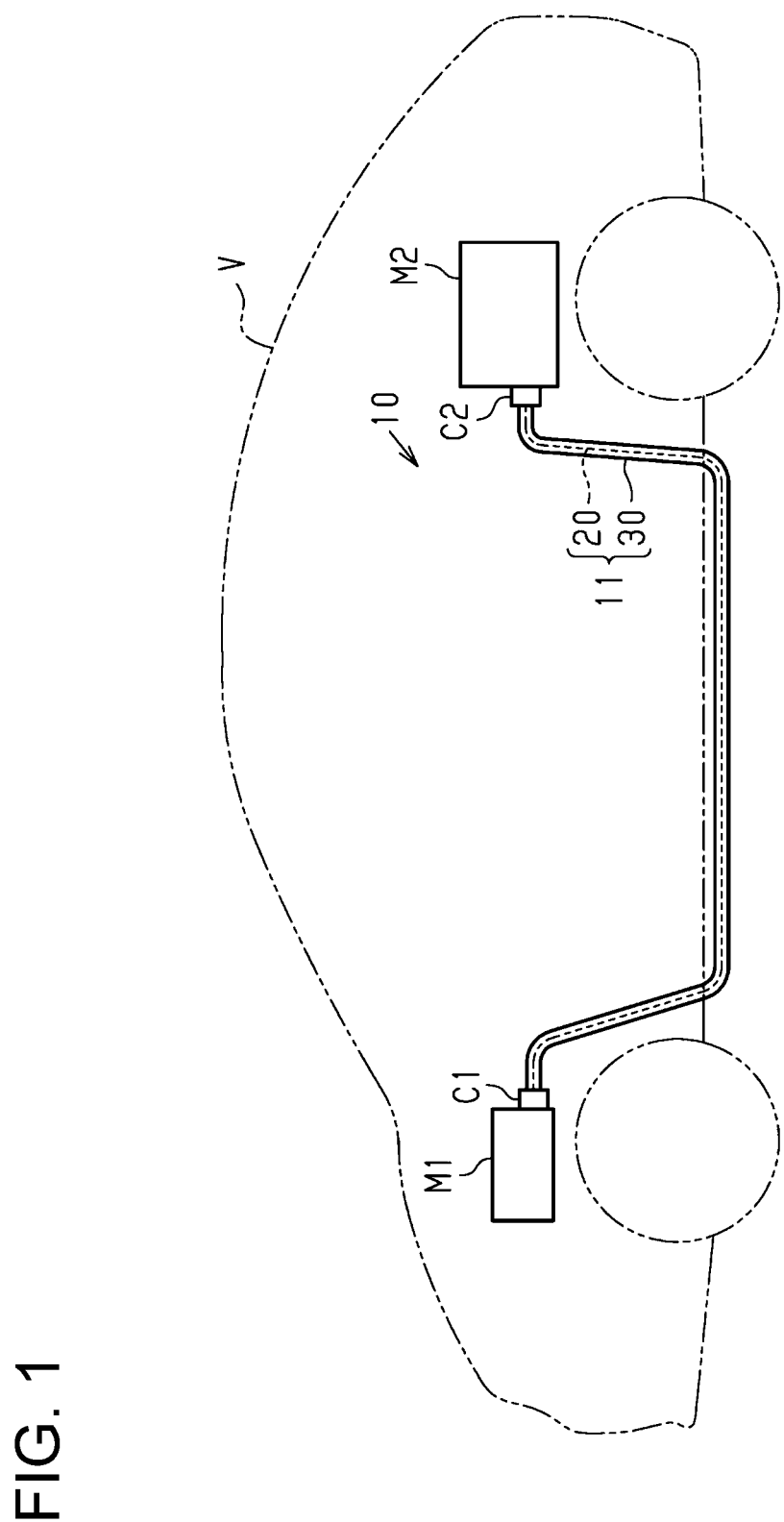
FIG. 1 is a schematic configuration diagram showing a wire harness in an embodiment.

First, embodiments of the present disclosure will be listed and described.

[1] A wire harness in the present disclosure includes: a wire harness body that includes an electric wire member and an outer sheath member configured to cover an outer circumference of the electric wire member; a first route regulating member that is to be attached to an outer circumference of the outer sheath member and is configured to regulate a route of the wire harness body; and a fixing member configured to fix the first route regulating member to an attachment target, wherein the first route regulating member includes: an insertion inlet that is open in a direction orthogonal to a length direction of the first route regulating member and extends over the entire first route regulating member in the length direction; and a first coupling part that is partially provided in a circumferential direction of the first route regulating member, and the fixing member includes: a fixing part that is to be fixed to the attachment target; and a second coupling part that is to be coupled to the first coupling part.

According to this configuration, the second coupling part of the fixing member is coupled to the first coupling part that is partially provided in the circumferential direction of the first route regulating member. Thus, there is no need to form the second coupling part so as to cover the entire circumference of the first route regulating member. Therefore, it is possible to downsize the wire harness in the radial direction at the attachment portion of the fixing member.

[2] One of the first coupling part and the second coupling part is a concave part, and the other of the first coupling part and the second coupling part is a convex part that is to be fitted into the concave part.

According to this configuration, it is possible to couple the first coupling part and the second coupling part in a simple manner.

[3] A cross-sectional shape of the first route regulating member orthogonal to the length direction is uniform over the entire length of the first route regulating member in the length direction, and the first coupling part is provided over the entire length of the first route regulating member in the length direction.

According to this configuration, the first route regulating member can be formed through extrusion molding. Therefore, the first route regulating member can be easily manufactured, thereby contributing to cost saving. The concave shape or convex shape of the first coupling part in the first route regulating member also has a cross-sectional shape that is uniform in the length direction of the first route regulating member.

[4] The second coupling part is attachable to the first coupling part along the length direction from an end portion of the first coupling part in the length direction of the first route regulating member.

According to this configuration, the second coupling part can be attached to the first coupling part in the length direction of the first route regulating member. As a result, the fixing member can be easily attached to the first route regulating member.

[5] The second coupling part is coupled to the first coupling part so as to be movable in the length direction of the first route regulating member, and a movement regulating part configured to regulate movement of the second coupling part in the length direction of the first route regulating member is attached to at least one of two end portions of the first route regulating member in the length direction.

According to this configuration, the movement regulating part can suppress detachment of the fixing member from the first route regulating member.

[6] The wire harness further includes a second route regulating member configured to regulate a route of the wire harness body that is to be attached to the outer circumference of the outer sheath member, wherein the second route regulation part includes a covering coupling part that is coupled to an end portion of the first route regulating member in the length direction so as to cover the outer circumference of the end portion, and the covering coupling part functions as the movement regulating part.

According to this configuration, the first route regulating member and the second route regulating member are coupled by the covering coupling part in the length direction. Thus, the route of the wire harness body is continuously regulated by the first route regulating member and the second route regulation part. The covering coupling part also serves as the movement regulating part that regulates the movement of the second coupling part, thereby enabling simplification of the structure.

[7] The first route regulating member regulates a route of a linear portion that is a linear portion of the route of the wire harness body, and the second route regulating member regulates a route of a bent portion that is a bent portion of the route of the wire harness body.

According to this configuration, the route of the linear portion is regulated by the first route regulating member, and the route of the bent portion is regulated by the second route regulating member. Accordingly, it is possible to continuously suppress deviation of the route of the linear portion and the route of the bent portion of the wire harness body from their respective desired routes.

Details of Embodiments of Present Disclosure

A specific example of the wire harness in the present disclosure will be described below with reference to the drawings. In the drawings, for convenience of description, some components may be exaggerated or simplified. Also, dimensional ratios of the components may vary between drawings. The term "orthogonal" used herein includes not only a strictly orthogonal state but also a generally orthogonal state within the scope of operation and effect of the present embodiment.

The term "opposing" used herein means that two surfaces or members are positioned facing one another, and includes not only a case in which two surfaces are positioned completely facing one another but also a case in which two surfaces are positioned partially facing one another. In addition, the term "opposing" herein includes both a case where a third member is interposed between two parts and a case in which no member is interposed between two parts.

The term "annular" used herein may refer to any structure forming a loop or an endless continuous shape, and a generally loop-shaped structure having a gap such as a C-shaped structure. The "annular" shape includes a circular shape, an oval shape, and a polygonal shape with pointed or rounded corners, but is not limited thereto.

Overall Configuration of Wire Harness 10

The wire harness 10 shown in FIG. 1 is installed in a vehicle V such as a hybrid vehicle or an electric automobile, for example. The wire harness 10 electrically connects two or more in-vehicle devices. The in-vehicle devices are electric devices installed in the vehicle V. The wire harness 10 electrically connects an inverter M1 installed in the front part of the vehicle V and a high-voltage battery M2 installed rearward of the inverter M1 in the vehicle V, for example. The wire harness 10 is formed in an elongated shape so as to extend in the front-back direction of the vehicle V. The wire harness 10 is routed in the vehicle V such that an intermediate portion of the wire harness 10 in the length direction thereof passes outside the vehicle interior such as the underfloor part of the vehicle V, for example.

The inverter M1 is connected to a wheel driving motor not shown that is a motive power source for vehicle travel, for example. The inverter M1 generates AC power from DC power from the high-voltage battery M2, and supplies the AC power to the motor. The high-voltage battery M2 is a battery that can supply a voltage of several hundred volts, for example.

The wire harness 10 has a wire harness body 11. The wire harness body 11 has an electric wire member 20 (electric wire) and a tubular outer sheath member 30 (outer sheath) that covers the outer circumference of the electric wire member 20. The wire harness 10 has connectors C1 and C2 that are respectively attached to two ends of the electric wire member 20. One end portion of the electric wire member 20 in the length direction is connected to the inverter M1 via the connector C1, and the other end of the electric wire member 20 in the length direction is connected to the high-voltage battery M2 via the connector C2.

Figure 2:
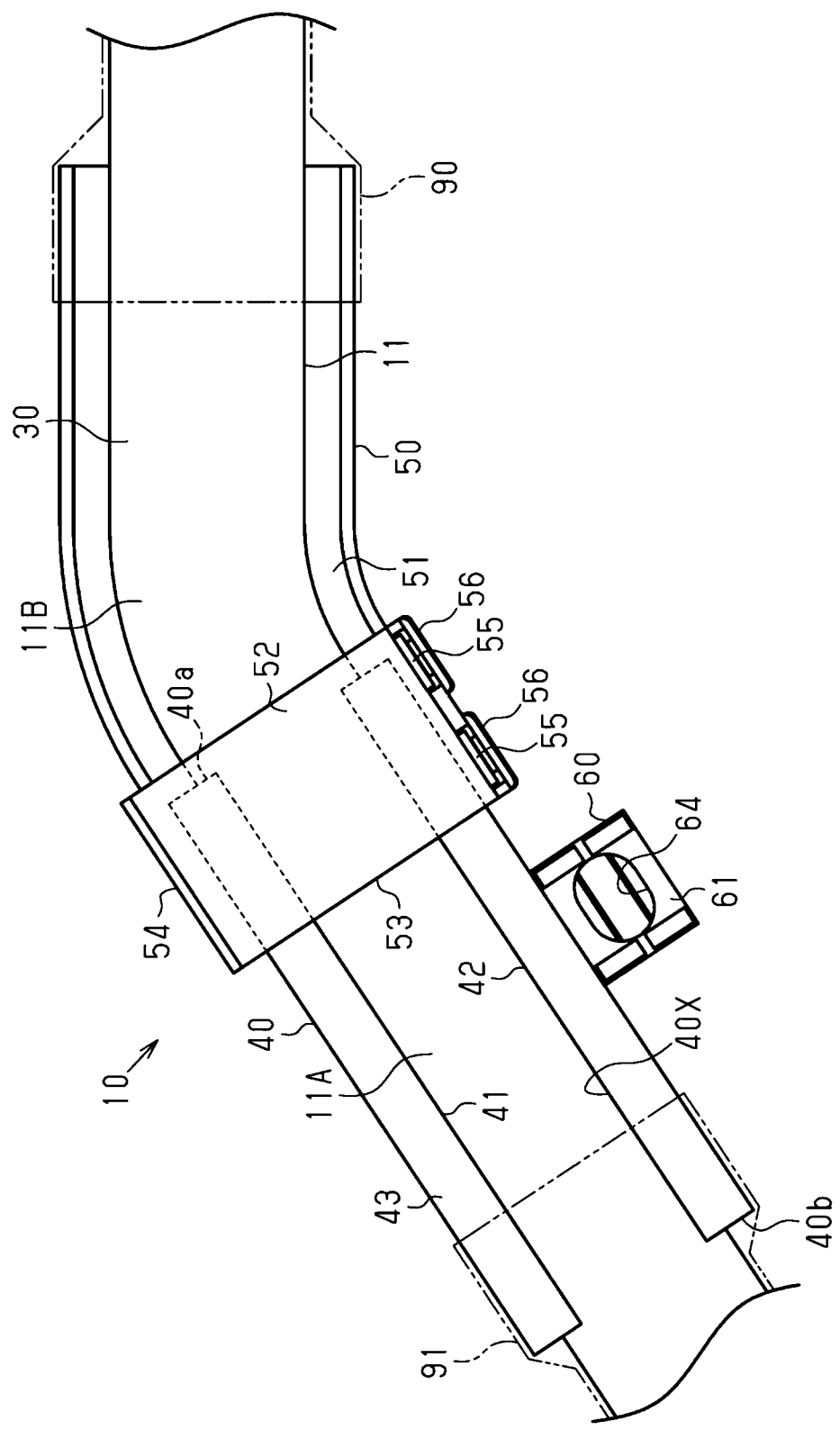
FIG. 2 is a schematic plan view of the wire harness in the embodiment.

As shown in FIG. 2, the wire harness 10 has a first route regulating member 40 (first route regulator) that is attached to the outer circumference of the outer sheath member 30 and a second route regulating member 50 (second route regulator) that is attached to the outer circumference of the outer sheath member 30. The first route regulating member 40 and the second route regulating member 50 regulate a route in which the wire harness body 11 is routed. The wire harness 10 also includes a fixing member 60 for fixing the first route regulating member 40 to the vehicle V. FIG. 1 does not show the first route regulating member 40, the second route regulating member 50, and the fixing member 60.

Configuration of Electric Wire Member 20

Figure 3:
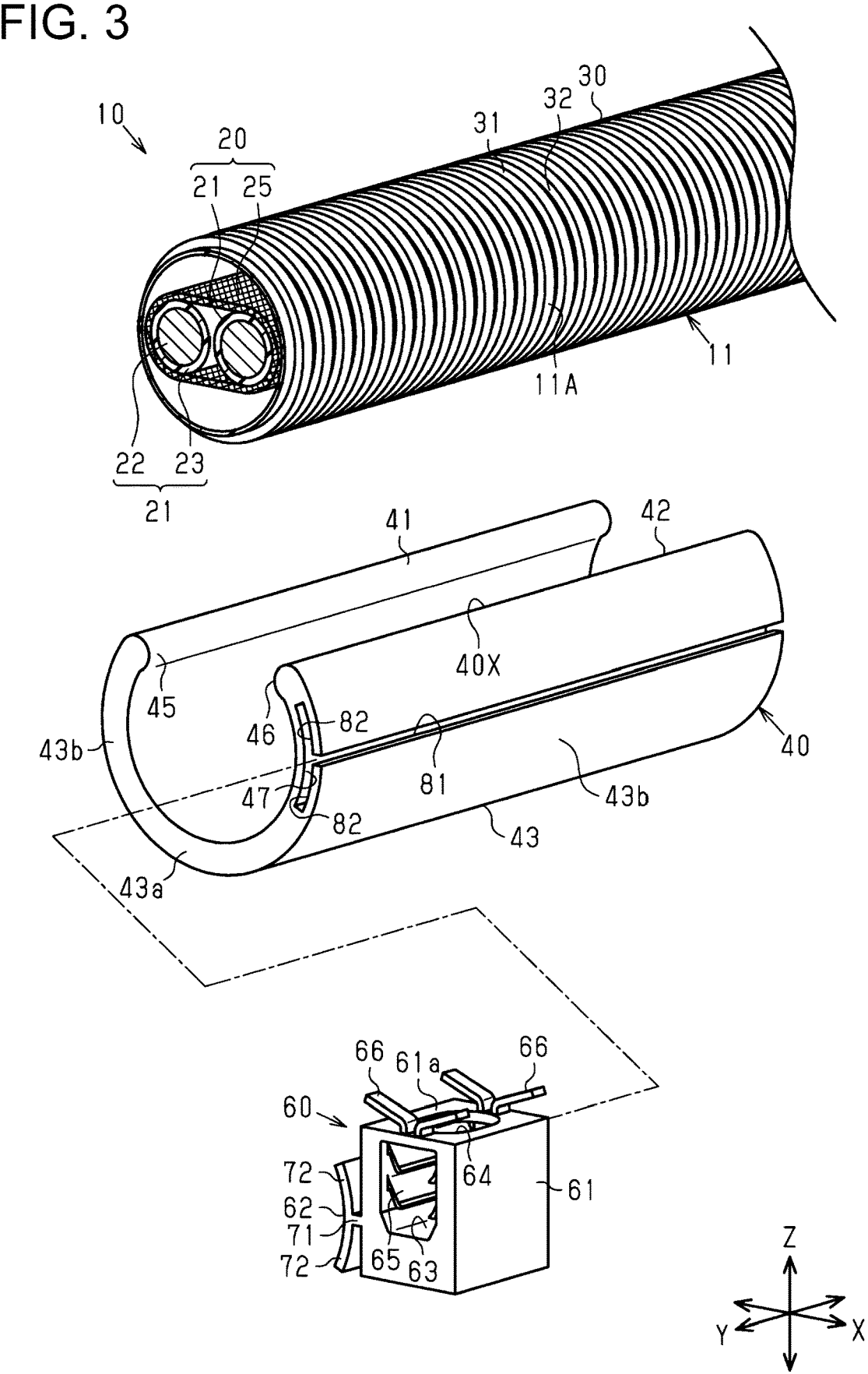
FIG. 3 is a schematic exploded perspective view of the wire harness in the embodiment.
Figure 4:
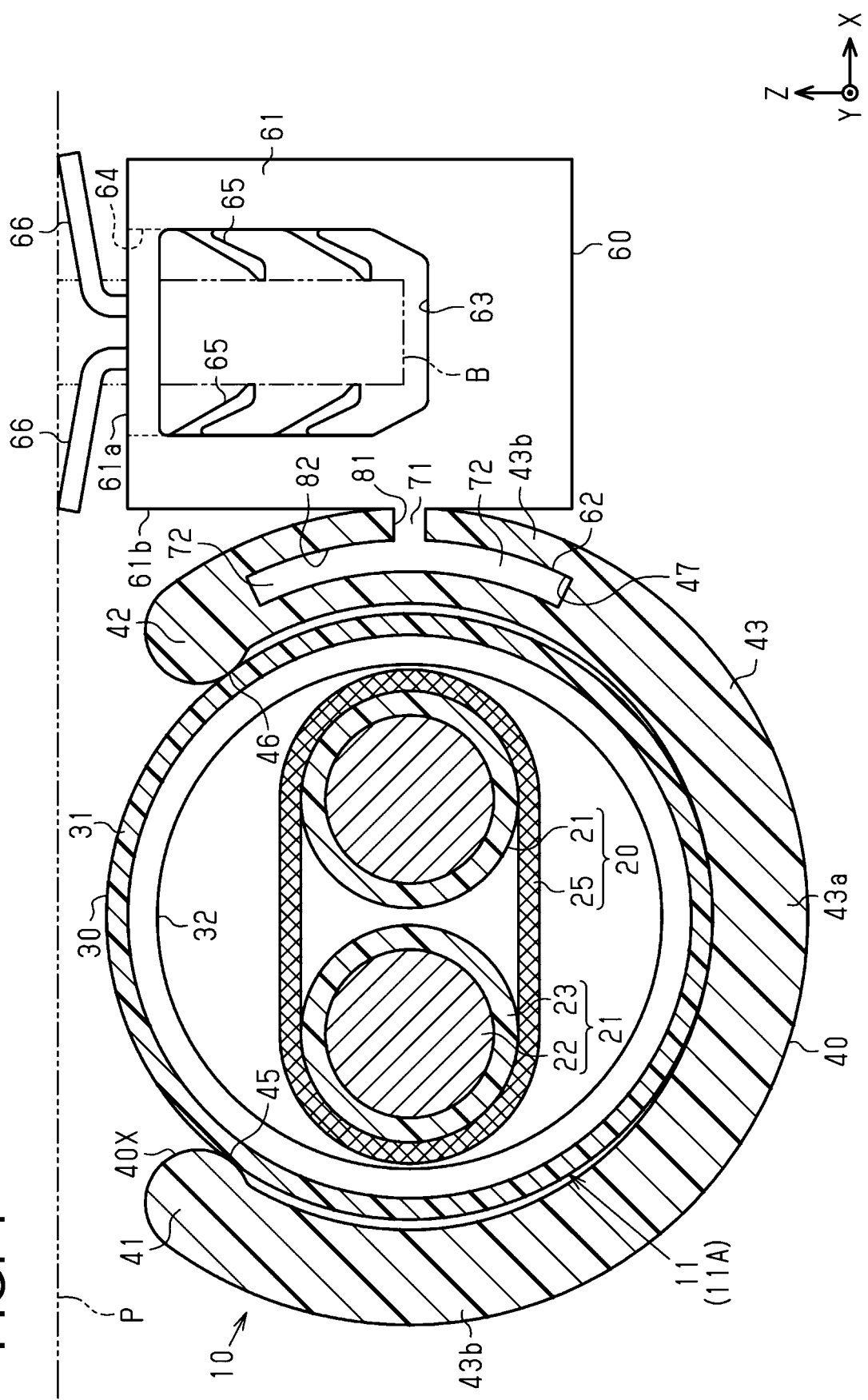
FIG. 4 is a schematic transverse cross-sectional view of the wire harness in the embodiment.

As shown in FIGS. 3 and 4, the electric wire member 20 has one or more electric wires 21, for example, and in the present embodiment, has two electric wires 21 and a braided member 25 that collectively surrounds the outer circumferences of the plurality of electric wires 21.

Each of the electric wires 21 is a coated electric wire that has a conductive core wire 22 and an insulating coating 23 that surrounds the outer circumference of the core wire 22 and has insulation properties. Each of the electric wires 21 is a high-voltage electric wire that can support high voltages and large currents, for example. Each of the electric wires 21 may be a non-shielded electric wire without an electromagnetic shielding structure or may be a shielded electric wire with an electromagnetic shielding structure, for example. Each of the electric wires 21 in the present embodiment is a non-shielded electric wire.

The core wire 22 may be a twisted wire formed by twisting a plurality of metal strands together or may be a single core wire made of a single conductor, for example. The single core wire may be a columnar conductor formed by one columnar metal rod having a solid structure or a tubular conductor having a hollow structure, for example. The core wire 22 may be a combination of a twisted wire, a columnar conductor, and a tubular conductor. The material for the core wire 22 may be a metallic material such as a copper-based or aluminium-based material, for example.

The insulating coating 23 covers the entire outer circumferential surface of the core wire 22 in the circumferential direction of the core wire 22, for example. The insulating coating 23 is made of an insulating resin material, for example. The cross section of each electric wire 21 taken along a plane orthogonal to the length direction of the electric wires 21, that is, the transverse cross section of each electric wire 21 can be formed in any shape. The transverse cross section of each electric wire 21 is formed in a circular shape, a semi-circular shape, a polygonal shape, a square shape, a flat shape, or the like, for example. The transverse cross section of each electric wire 21 in the present embodiment is formed in a circular shape.

The braided member 25 has a tubular shape that collectively surrounds the outer circumferences of the plurality of electric wires 21 as a whole, for example. The braided member 25 may be a braided wire formed by braiding a plurality of metal strands or may be a braided wire formed by combining a metal strand and a resin strand, for example. The material for the metal strand may be a metallic material such as a copper-based material or aluminium-based material, for example. Although not shown in the drawings, two end portions of the braided member 25 in the length direction are grounded by the connectors C1 and C2 (see FIG. 1), for example.

Configuration of Outer Sheath Member 30

The outer sheath member 30 has a tubular shape that surrounds the entire outer circumference of the electric wire member 20 in the circumferential direction. The outer sheath member 30 in the present embodiment is formed in the shape of a cylinder. The outer sheath member 30 has a peripheral wall formed continuous over the entire circumferential direction of the outer sheath member 30, for example. The outer sheath member 30 entirely seals the inside of the outer sheath member 30 in the circumferential direction, for example. The outer sheath member 30 has the function of protecting the electric wire member 20 from flying objects and water droplets, for example.

The outer sheath member 30 is flexible and is easy to bend, for example. Examples of the flexible outer sheath member 30 include a resin corrugated tube and a rubber waterproof cover. The outer sheath member 30 in the present embodiment is a resin corrugated tube having an accordion shape of which the diameter is repeatedly increased and decreased in the length direction of the outer sheath member 30. That is, the outer sheath member 30 in the present embodiment has an accordion structure in which a large-diameter part 31 and a small-diameter part 32 smaller in diameter than the large-diameter part 31 are alternately connected to each other along the length direction of the outer sheath member 30. Each of the large-diameter part 31 and the small-diameter part 32 has an annular shape that extends once around the circumferential direction of the outer sheath member 30, for example. The material of the outer sheath member 30 may be a synthetic resin such as polyolefin, polyamide, polyester, or ABS resin, for example. FIG. 2 shows the outer sheath member 30 in a simplified manner for the sake of simplifying the diagram.

Configurations of First Route Regulating Member 40 and Second Route Regulating Member 50

As shown in FIG. 2, the first route regulating member 40 and the second route regulating member 50 hold the outer sheath member 30. The first route regulating member 40 and the second route regulating member 50 are both harder than the outer sheath member 30, for example. The first route regulating member 40 and the second route regulating member 50 are less likely to bend than the outer sheath member 30 in a direction orthogonal to the length direction of the wire harness body 11. Accordingly, the first route regulating member 40 and the second route regulating member 50 regulate the route of the wire harness body 11. For example, each of the first route regulating member 40 and the second route regulating member 50 supports the outer sheath member 30 such that the wire harness body 11 does not warp under its own weight and deviate from a desired route.

The first route regulating member 40 is partially provided in the length direction of the wire harness body 11. The first route regulating member 40 is attached to the outer circumference of the outer sheath member 30 at a linear portion 11A of the route of the wire harness body 11, for example. The first route regulating member 40 regulates the route of the wire harness body 11 at the linear portion 11A. The linear portion 11A here is a portion of the route of the wire harness body 11 that extends linearly in one direction. One or more first route regulating members 40 are provided in accordance with the route of the wire harness body 11.

The second route regulating member 50 is partially provided in the length direction of the wire harness body 11. The second route regulating member 50 is attached to the outer circumference of the outer sheath member 30 at a bent portion 11B of the route of the wire harness body 11, for example. The second route regulating member 50 regulates the route of the wire harness body 11 at the bent portion 11B. The bent portion 11B is a portion that is bent such that the route of the wire harness body 11 deviates from a straight line. One or more second route regulating members 50 are provided in accordance with the route of the wire harness body 11.

Configuration of First Route Regulating Member 40

As shown in FIGS. 3 and 4, the first route regulating member 40 covers a portion of the outer circumference of the outer sheath member 30 in the circumferential direction of the outer sheath member 30. The first route regulating member 40 is shaped to cover a portion of the outer circumference of the outer sheath member 30 in the circumferential direction of the outer sheath member 30. The transverse cross section of the first route regulating member 40 has a C shape overall. The first route regulating member 40 covers an area larger than half of the outer circumference of the outer sheath member 30, for example. That is, the first route regulating member 40 covers an area larger than half of the entire outer circumference of the outer sheath member 30 in the circumferential direction of the outer sheath member 30.

As shown in FIG. 2, the first route regulating member 40 extends along the length direction of the outer sheath member 30 at the linear portion 11A. The first route regulating member 40 is shaped to extend linearly in one direction, for example. The transverse cross section of the first route regulating member 40 is uniform over the entire length of the first route regulating member 40 in the length direction of the first route regulating member 40, for example.

The first route regulating member 40 is made of a metal or a resin, for example. The first route regulating member 40 in the present embodiment is made of a resin. The material for the first route regulating member 40 may be a synthetic resin such as polypropylene, polyamide, or polyacetal, for example. The first route regulating member 40 can be manufactured using a known manufacturing method such as extrusion molding or injection molding, for example. In the present embodiment, the first route regulating member 40 is an extruded component manufactured through extrusion molding. Thus, the first route regulating member 40 can be easily manufactured by using an extrusion molding machine that extrudes the raw material for the first route regulating member 40 in a length direction. In addition, a plurality of kinds of the first route regulating member 40 differing in length in the length direction can be manufactured using a single extrusion molding machine. For example, a plurality of kinds of the first route regulating member 40 differing in length in the length direction can be manufactured by cutting the base material for the first route regulating member 40 formed by a single extrusion molding machine to appropriate lengths using a cutting machine.

As shown in FIGS. 3 and 4, the first route regulating member 40 has an insertion inlet 40X that is open in a direction orthogonal to the length direction of the first route regulating member 40. The insertion inlet 40X extends over the entire the first route regulating member 40 in the length direction. The first route regulating member 40 has a first end portion 41 and a second end portion 42 that are two end portions of the first route regulating member 40 in the circumferential direction and form the insertion inlet 40X. The first route regulating member 40 has a coupling part 43 that couples the first end portion 41 and the second end portion 42. In other words, the first route regulating member 40 has the coupling part 43 that is formed so as to cover a portion of the outer sheath member 30 in the circumferential direction, the first end portion 41 and the second end portion 42 provided at two ends of the coupling part 43, and the insertion inlet 40X formed by the first end portion 41 and the second end portion 42.

The coupling part 43 constitutes the main portion of the first route regulating member 40. The thickness of the coupling part 43 in the radial direction is uniform in the circumferential direction of the first route regulating member 40, for example. The transverse cross section of the coupling part 43 is shaped so as to follow the outer surface of the outer sheath member 30, for example. The transverse cross sections of the first end portion 41, the second end portion 42, and the coupling part 43 are formed in an arc shape, for example.

The first end portion 41 and the second end portion 42 are provided so as to oppose each other in the circumferential direction of the first route regulating member 40. The first end portion 41 and the second end portion 42 are spaced apart from each other with the insertion inlet 40X therebetween in the circumferential direction of the first route regulating member 40. In other words, the gap between the first end portion 41 and the second end portion 42 is formed as the insertion inlet 40X in the circumferential direction of the first route regulating member 40. Thus, the first route regulating member 40 is formed in a C shape that has the insertion inlet 40X at a portion of the first route regulating member 40 in the circumferential direction.

The transverse cross sections of leading ends of the first end portion 41 and the second end portion 42 are formed in a curved shape. The transverse cross sections of the leading ends of the first end portion 41 and the second end portion 42 in the present embodiment are formed in an arc shape.

The first route regulating member 40 has a protrusion part 45 that protrudes from the inner surface of the first end portion 41 and a protrusion part 46 that protrudes from the inner surface of the second end portion 42. The protrusion parts 45 and 46 protrude toward the outer sheath member 30 inserted into the first route regulating member 40 and come into contact with the outer surface of the outer sheath member 30. The protrusion parts 45 and 46 come into contact with the outer surfaces of the large-diameter parts 31 of the outer sheath member 30. The protrusion part 45 protrudes from the inner surface of leading end of the first end portion 41, for example. The protrusion part 46 protrudes from the inner surface of leading end of the second end portion 42, for example. The transverse cross sections of the protrusion parts 45 and 46 are formed in a curved shape, for example. The transverse cross sections of the protrusion parts 45 and 46 in the present embodiment are formed in an arc shape, for example. The protrusion parts 45 and 46 extend in the length direction of the first route regulating member 40. The protrusion parts 45 and 46 extend over the entire length of the first route regulating member 40 in the length direction of the first route regulating member 40, for example.

The protrusion parts 45 and 46 press the outer sheath member 30 from the outside of the outer sheath member 30. The outer sheath member 30 is elastically sandwiched between the protrusion parts 45, 46, and the coupling part 43. Accordingly, the first route regulating member 40 can be firmly coupled to the outer sheath member 30.

As shown in FIG. 4, the opening width of the insertion inlet 40X, that is, the shortest distance between the first end portion 41 and the second end portion 42 is smaller than the outer diameter of the outer sheath member 30.

The opening width of the insertion inlet 40X increases in response to elastic deformation of the first route regulating member 40. For example, the opening width of the insertion inlet 40X is increased in response to the outer sheath member 30 being inserted into the insertion inlet 40X from a direction orthogonal to the length direction of the first route regulating member 40. When the outer sheath member 30 is inserted into the first route regulating member 40, the first route regulating member 40 elastically returns to its original shape. Accordingly, the opening width of the insertion inlet 40X becomes smaller than the outer diameter of the outer sheath member 30, and thus the first route regulating member 40 can be attached to the outer circumference of the outer sheath member 30.

As shown in FIGS. 3 and 4, the first route regulating member 40 has a first coupling part 47 (first coupling) in the coupling part 43. The first coupling part 47 is partially provided in the circumferential direction of the first route regulating member 40. The first coupling part 47 is also provided over the entire length of the first route regulating member 40 in the length direction. The fixing member 60 is coupled to the first coupling part 47.

Configuration of Second Route Regulating Member 50

As shown in FIG. 2, the second route regulating member 50 is attached to the outer circumference of a portion of the first route regulating member 40 in the length direction. The second route regulating member 50 is attached to the outer circumference of an end portion 40a of the first route regulating member 40 in the length direction. The second route regulating member 50 is also attached to the outer circumference of the outer sheath member 30 at the bent portion 11B. The second route regulating member 50 extends along the length direction of the outer sheath member 30 at the bent portion 11B. The second route regulating member 50 is bent so as to follow the shape of the bent portion 11B, for example.

The second route regulating member 50 has a body part 51 and a lid part 52. The second route regulating member 50 including the body part 51 and the lid part 52 is made of a metal or a resin, for example. The second route regulating member 50 in the present embodiment is made of a resin. The material for the second route regulating member 50 may be a synthetic resin such as polypropylene, polyamide, or polyacetal, for example. The second route regulating member 50 can be manufactured using a known manufacturing method such as injection molding, for example.

The body part 51 covers a portion of the outer circumference of the outer sheath member 30 in the circumferential direction of the outer sheath member 30. The body part 51 is shaped to cover the outer circumference of a portion of the outer sheath member 30 in the circumferential direction of the outer sheath member 30. The transverse cross section of the body part 51 is formed in a semi-circular cylindrical shape overall. The body part 51 covers almost half of the outer circumference of the outer sheath member 30. The body part 51 extends along the length direction of the outer sheath member 30 at the bent portion 11B. The body part 51 is bent so as to follow the shape of the bent portion 11B.

The second route regulating member 50 has a covering coupling part 53 (cover coupling) that includes the lid part 52 at an end portion of the body part 51 in the length direction. The covering coupling part 53 is coupled to the end portion 40a of the first route regulating member 40 in the length direction. The covering coupling part 53 is formed of the end portion of the body part 51 in the length direction and the lid part 52. The covering coupling part 53 is formed in an annular shape as seen in the length direction of the wire harness body 11. The covering coupling part 53 covers the entire circumference of the end portion 40a in the length direction of the first route regulating member 40 with the lid part 52 and an end portion of the body part 51 in the length direction.

The lid part 52 is formed integrally with the body part 51, for example. The lid part 52 is connected to the body part 51 at a hinge part 54, for example. The lid part 52 is pivotable about the hinge part 54 between an open position and a closed position for covering the first route regulating member 40 and the outer sheath member 30. The lid part 52 shown in FIG. 2 is in the closed position. The lid part 52 has locking claws 55. When the lid part 52 is in the closed position, the locking claws 55 are locked to lock parts 56 provided in the body part 51. Accordingly, the lid part 52 is held in the closed position.

As shown in FIG. 2, the wire harness 10 has a slide regulating member 90 that regulates sliding movement of the second route regulating member 50 in the length direction of the outer sheath member 30, for example. The slide regulating member 90 may be a zip tie made of a resin or a metal, a crimping ring, a piece of adhesive tape, or the like, for example. The slide regulating member 90 in the present embodiment is a piece of adhesive tape. The slide regulating member 90 is wound around the end portion of the second route regulating member 50 not coupled to the first route regulating member 40 and the outer sheath member 30.

Configuration of Fixing Member 60

As shown in FIG. 4, the fixing member 60 is for fixing the first route regulating member 40 to a panel P constituting the floor part of the vehicle V. The fixing member 60 is made of a metal or a resin, for example. The fixing member 60 in the present embodiment is made of a resin. The material for the fixing member 60 may be a synthetic resin such as polypropylene, polyamide, or polyacetal, for example. The fixing member 60 can be manufactured using a known manufacturing method such as injection molding, for example. In the present embodiment, as an example, one fixing member 60 is provided on the first route regulating member 40. Alternatively, a plurality of fixing members 60 may be provided on the first route regulating member 40.

As shown in FIGS. 3 and 4, the fixing member 60 has a fixing part 61 that is fixed to the panel P and a second coupling part 62 (second coupling) that is coupled to the first coupling part 47 of the first route regulating member 40.

The fixing part 61 has a structure with which it is fixed to a bolt B extending from the panel P as an example. The fixing part 61 has an insertion hole 63 into which the bolt B is inserted. FIGS. 3 and 4 show a width direction X, a depth direction Y, and a height direction Z as three directions orthogonal to one another in the fixing member 60. The bolt B is inserted into the insertion hole 63 along the height direction Z.

The fixing part 61 has a first side surface 61a that opposes the panel P when the fixing member 60 is attached to the vehicle V. The insertion hole 63 is open on one end side of the first side surface 61a in the height direction Z. That is, the insertion hole 63 has a bolt insertion inlet 64 into which the bolt B is inserted, on the first side surface 61a thereof. The insertion hole 63 in the present embodiment is also open to two sides in the depth direction Y.

Provided inside the insertion hole 63 are locking parts 65 that axially lock to the bolt B inserted in the fixing part 61 through the bolt insertion inlet 64. The locking parts 65 extend from a pair of inner wall surfaces of the insertion hole 63 opposing each other in the width direction X, for example. The plurality of locking parts 65 are provided in parallel in the height direction Z, for example. The locking parts 65 are inclined forward in the insertion direction of the bolt B from the pair of inner wall surfaces while extending inward, for example. The leading ends of the locking parts 65 lock with the threads of the bolt B in the axial direction of the bolt B.

The fixing part 61 has elastic pieces 66 on the first side surface 61a. The elastic pieces 66 are provided on two sides of the insertion hole 63 in the depth direction Y, for example. The elastic pieces 66 come into elastic contact with the panel P when the fixing member 60 is attached to the vehicle V. That is, the elastic pieces 66 impart an elastic force to the panel P. Accordingly, it is possible to suppress rattling of the fixing member 60.

Configurations of First Coupling Part 47 and Second Coupling Part 62

The second coupling part 62 is a convex part that protrudes in the width direction X from a second side surface 61b of the fixing part 61, for example. The second coupling part 62 in the present embodiment is formed integrally with the fixing part 61.

The second coupling part 62 has a base part 71 that extends from the second side surface 61b along the width direction X and a pair of extension parts 72 that are branched in two directions from the leading end of the base part 71. The pair of extension parts 72 extend from the base part 71 to one and the other sides in the height direction Z. Accordingly, the second coupling part 62 has a substantially T-shaped cross section orthogonal to the length direction of the first route regulating member 40. The pair of extension parts 72 have cross sections orthogonal to the length direction of the first route regulating member 40 in an arc shape extending along the circumferential direction of the first route regulating member 40, for example. The cross section of the second coupling part 62 orthogonal to the length direction of the first route regulating member 40 is uniform in the length direction of the first route regulating member 40, for example.

The first coupling part 47 is a concave part into which the second coupling part 62 is fitted. The first coupling part 47 is provided at a portion of the coupling part 43 in the circumferential direction. In the coupling part 43, the portion opposing the insertion inlet 40X is designated as a bottom portion 43*a*, and the portion ranging from the bottom portion 43*a* to the first end portion 41 and the portion ranging from the bottom portion 43*a* to the second end portion 42 are designated as side portions 43*b*. The first coupling part 47 is provided in one of the two side portions 43*b*.

The first coupling part 47 has a substantially T-shaped cross section orthogonal to the length direction of the first route regulating member 40, which is similar to the cross section of the second coupling part 62. More specifically, the first coupling part 47 has a first storage part 81 in which the base part 71 of the second coupling part 62 is disposed and a pair of second storage parts 82 in which the pair of extension parts 72 are disposed. The first storage part 81 extends from the outer circumferential surface of the coupling part 43 to the inside of the coupling part 43 along the radial direction of the first route regulating member 40. The pair of second storage parts 82 extend from the first storage part 81 in opposite directions along the circumferential direction of the first route regulating member 40.

The cross-sectional shape of the first coupling part 47 orthogonal to the length direction of the first route regulating member 40 is uniform in the length direction of the first route regulating member 40. The first coupling part 47 is provided over the entire length of the first route regulating member 40 in the length direction. That is, the first coupling part 47 is open in the length direction of the first route regulating member 40 at two end surfaces of the first route regulating member 40 in the length direction of the first route regulating member 40.

The second coupling part 62 can be attached to the first coupling part 47 from the opening at an end portion of the first coupling part 47 in the length direction of the first route regulating member 40, along the length direction of the first route regulating member 40. When the second coupling part 62 is coupled to the first coupling part 47, that is, when the base part 71 and the extension parts 72 are disposed in the first storage part 81 and the second storage parts 82, respectively, the second coupling part 62 can be moved in the length direction of the first route regulating member 40. Accordingly, the attachment position of the fixing member 60 can be adjusted in the length direction of the first route regulating member 40.

As shown in FIG. 2, the covering coupling part 53 provided at the end portion 40*a* of the first route regulating member 40 in the length direction functions as a movement regulating part (movement regulator) that regulates movement of the second coupling part 62 in the length direction of the first route regulating member 40. That is, the second coupling part 62 coupled to the first coupling part 47 is capable of abutting against the covering coupling part 53 covering the outer circumference of the end portion 40*a* of the first route regulating member 40, in the length direction of the first route regulating member 40. Accordingly, movement of the second coupling part 62 to one side in the length direction of the first route regulating member 40 can be regulated by the covering coupling part 53.

In the first route regulating member 40, a movement regulating part 91 is attached to an end portion 40*b* opposite to the end portion 40*a* in order to regulate movement of the second coupling part 62 in the length direction of the first route regulating member 40. The movement regulating part 91 may be a resin or metallic zip tie, a crimping ring, a piece of adhesive tape, or the like, for example. The movement regulating part 91 in the present embodiment is a piece of adhesive tape. The movement regulating part 91 is wound around the end portion 40*b* of the first route regulating member 40 and the outer sheath member 30.

The second coupling part 62 coupled to the first coupling part 47 can abut against the movement regulating part 91 wound around the outer circumference of the end portion 40*b* of the first route regulating member 40, in the length direction of the first route regulating member 40. Accordingly, movement of the second coupling part 62 to one side in the length direction of the first route regulating member 40 can be regulated by the movement regulating part 91. The movement regulating part 91 also regulates sliding movement of the first route regulating member 40 in the length direction of the outer sheath member 30.

Advantageous effects of the present embodiment will be described.

(1) The first route regulating member 40 has the first coupling part 47 partially provided in the circumferential direction of the first route regulating member 40. The fixing member 60 has the fixing part 61 that is fixed to the panel P and the second coupling part 62 coupled to the first coupling part 47. According to this configuration, the second coupling part 62 of the fixing member 60 is coupled to the first coupling part 47 partially provided in the circumferential direction of the first route regulating member 40. Accordingly, there is no need to form the second coupling part 62 so as to cover the entire circumference of the first route regulating member 40. Therefore, it is possible to downsize the wire harness 10 in the radial direction at the attachment portion of the fixing member 60.

(2) The first coupling part 47 is a concave part, and the second coupling part 62 is a convex part fitted into the first coupling part 47. According to this configuration, it is possible to couple the first coupling part 47 and the second coupling part 62 in a simple manner.

(3) The transverse cross-sectional shape of the first route regulating member 40, that is, the cross-sectional shape of the first route regulating member 40 orthogonal to the length direction is uniform over the entire length of the first route regulating member 40 in the length direction. The first coupling part 47 is provided over the entire length of the first route regulating member 40 in the length direction. According to this configuration, the first route regulating member 40 can be formed through extrusion molding. Therefore, the first route regulating member 40 can be easily manufactured, thus contributing to cost saving. The concave shape or convex shape of the first coupling part 47 in the first route regulating member 40 also has a cross-sectional shape that is uniform in the length direction of the first route regulating member 40.

(4) The second coupling part 62 can be attached to the first coupling part 47 from an end portion of the first coupling part 47 in the length direction of the first route regulating member 40 along the length direction. According to this configuration, the fixing member 60 can be attached to the first coupling part 47 in the length direction of the first route regulating member 40. As a result, the fixing member 60 can be easily attached to the first route regulating member 40.

(5) The second coupling part 62 is coupled to the first coupling part 47 so as to be movable in the length direction of the first route regulating member 40. The covering coupling part 53 is attached to the end portion 40*a* of the first route regulating member 40 in the length direction, serving as a movement regulating part that regulates movement of the second coupling part 62 in the length direction of the first route regulating member 40. The movement regulating part 91 is attached to the end portion 40b of the first route regulating member 40 in the length direction in order to regulate movement of the second coupling part 62 in the length direction of the first route regulating member 40. According to this configuration, the covering coupling part 53 and the movement regulating part 91 can suppress detachment of the second coupling part 62 from the end portions of the first coupling part 47 in the length direction.

(6) The wire harness 10 includes the second route regulating member 50 that is attached to the outer circumference of the outer sheath member 30 and regulates the route of the wire harness body 11. The second route regulating member 50 has the covering coupling part 53 that is coupled to the end portion 40a of the first route regulating member 40 in the length direction so as to cover the outer circumference of the end portion 40a. The covering coupling part 53 functions as the movement regulating part. According to this configuration, the first route regulating member 40 and the second route regulating member 50 are coupled to each other by the covering coupling part 53 in the length direction. Thus, the route of the wire harness body 11 is continuously regulated by the first route regulating member 40 and the second route regulating member 50. The covering coupling part 53 also serves as a movement regulating part that regulates movement of the second coupling part 62, thereby enabling simplification of the configuration.

(7) The first route regulating member 40 regulates the route of the linear portion 11A that is the linear portion of the route of the wire harness body 11. The second route regulating member 50 regulates the route of the bent portion 11B that is the bent portion of the route of the wire harness body 11. According to this configuration, it is possible to continuously suppress deviation of the route of the linear portion 11A and the route of the bent portion 11B of the wire harness body 11 from their respective desired routes.

The present embodiment can be modified as described below. The present embodiment and the following modification examples can be carried out in combination provided no technical contradiction arises.

Figure 5:
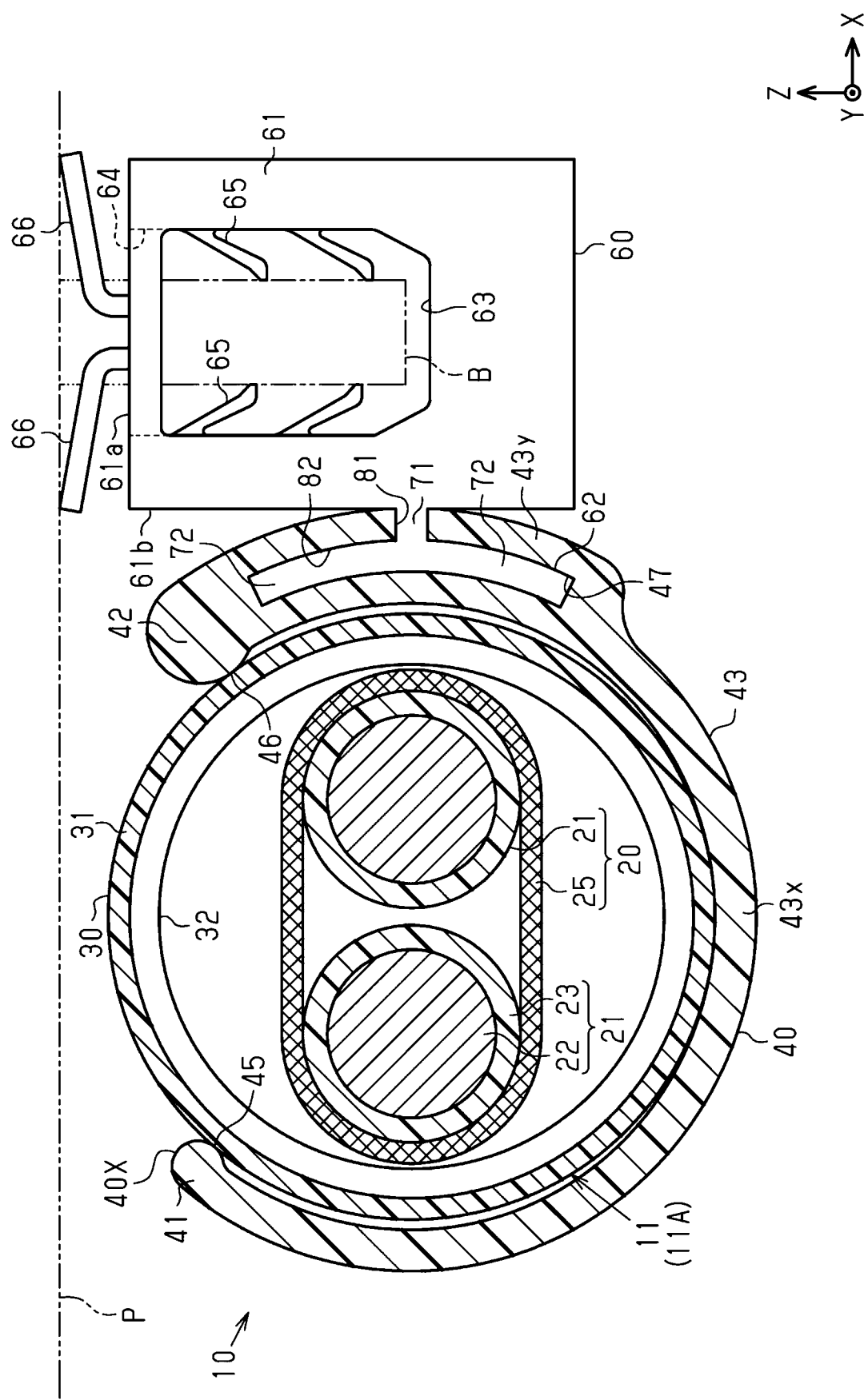
FIG. 5 is a schematic transverse cross-sectional view of a wire harness in a modification example.

For example, as shown in FIG. 5, in the coupling part 43 of the first route regulating member 40, the radial thickness of a portion 43x where the first coupling part 47 is not provided may be smaller than the radial thickness of a portion 43y where the first coupling part 47 is provided. According to this configuration, it is possible to further contribute to downsizing the wire harness 10 in the radial direction at the attachment portion of the fixing member 60.

Figure 6:
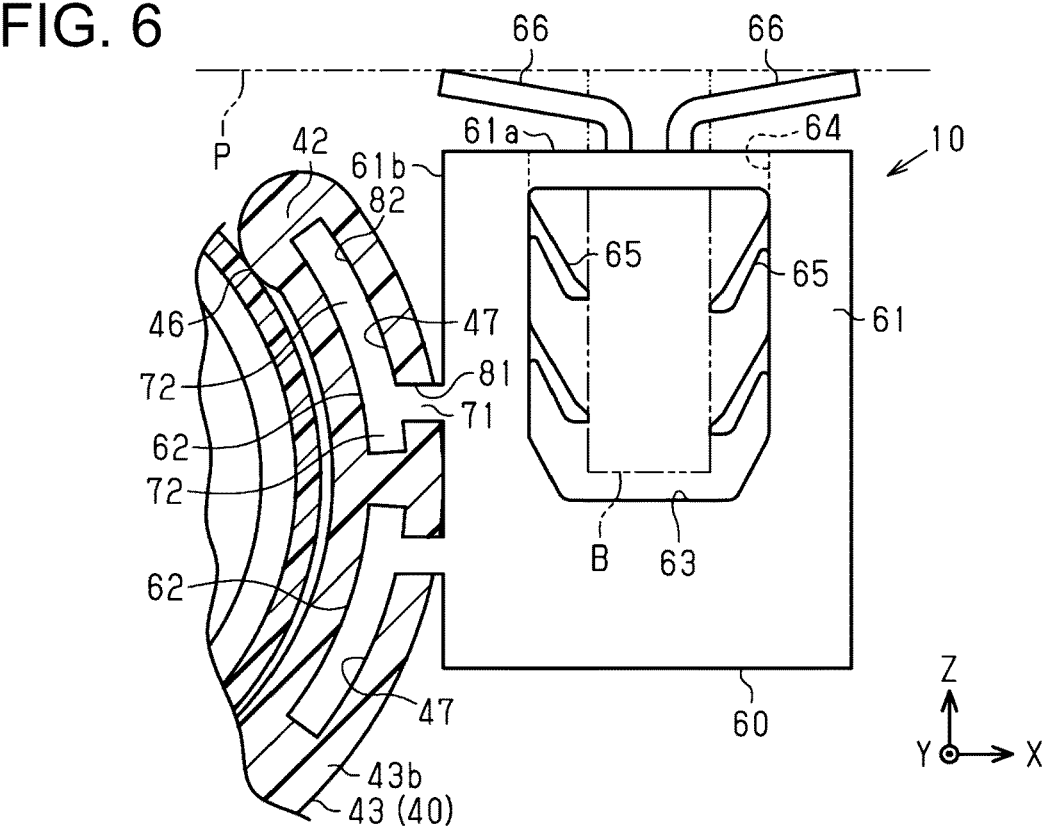
FIG. 6 is a schematic partial transverse cross-sectional view of the wire harness in a modification example.

In the foregoing embodiment, one first coupling part 47 and one second coupling part 62 are provided. However, the present disclosure is not limited to this configuration, and a plurality of first coupling parts 47 and a plurality of second coupling parts 62 may be provided. For example, in the configuration shown in FIG. 6, two first coupling parts 47 and two coupling parts 62 are provided. In each of the second coupling parts 62 of the same structure, an extension part 72 of the pair of extension parts 72 that extends toward the adjacent second coupling part 62 is made shorter. This makes it possible to reduce the area occupied by the second coupling parts 62 and the first coupling parts 47 in the circumferential direction of the first route regulating member 40.

The second coupling part 62 in the foregoing embodiment can be attached to the first coupling part 47 along the length direction of the first route regulating member 40. However, the present disclosure is not limited to this configuration. For example, the second coupling part 62 may be attachable to the first coupling part 47 from the outside of the first route regulating member 40 in the radial direction.

Figure 7:
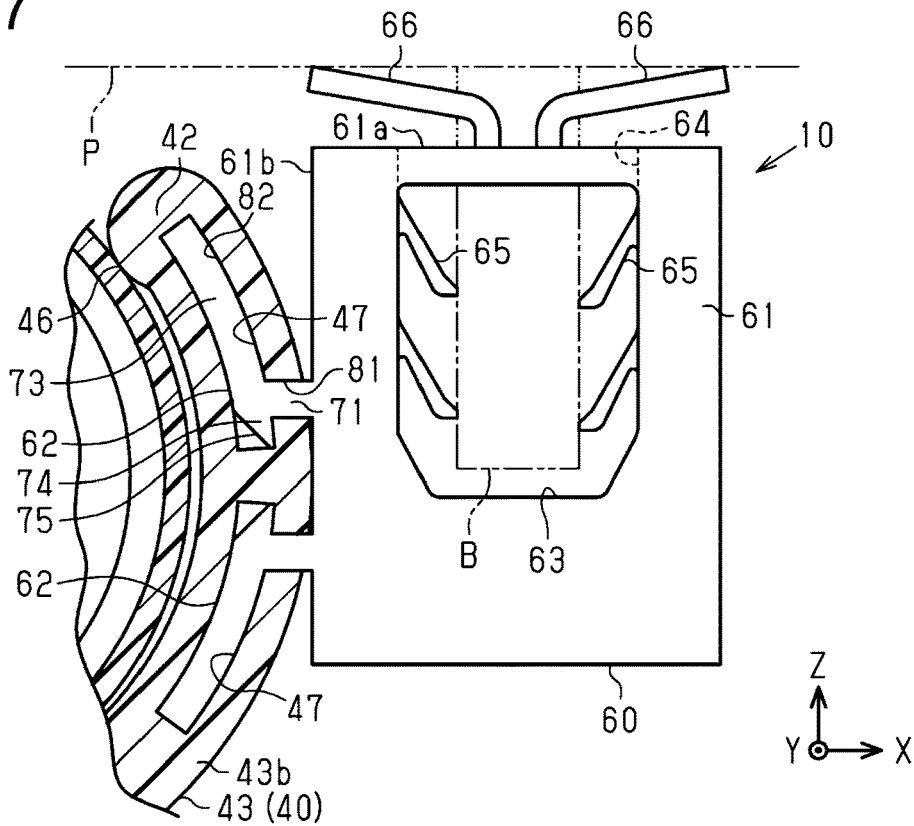
FIG. 7 is schematic partial transverse cross-sectional view of the wire harness in a modification example.

For example, in the configuration shown in FIG. 7, the second coupling part 62 is attachable to the first coupling part 47 from the outside of the first route regulating member 40 in the radial direction. In this configuration, two first coupling parts 47 and two second coupling parts 62 are provided. Each of the second coupling parts 62 has a first extension part 73 and a second extension part 74 extending from the leading end of the base part 71 along the circumferential direction of the first route regulating member 40. The first extension part 73 and the second extension part 74 extend from the leading end of the base part 71 in opposite directions. The first extension part 73 is made longer than the second extension part 74 in the circumferential direction of the first route regulating member 40. An inclined surface 75 is provided on the side surface on inner circumferential side of the second extension part 74 such that the thickness of the second extension part 74 in the direction along the radial direction of the first route regulating member 40 decreases toward the leading end of the second extension part 74. In this configuration, in order to attach the second coupling part 62 to the first coupling part 47, first, the leading end of the first extension part 73 is inserted into the second storage part 82 through the first storage part 81 from the outer circumferential side of the first route regulating member 40. Then, the second extension part 74 is inserted together with the base part 71 into the first storage part 81. Since the second extension part 74 has the inclined surface 75, the second extension part 74 can be easily inserted into the first coupling part 47. According to this configuration, the second coupling parts 62 and the first coupling parts 47 are partially provided in the circumferential direction of the first route regulating member 40, thereby allowing downsizing of the wire harness 10 in the radial direction at the attachment portion of the fixing member 60.

In the first route regulating member 40 of the foregoing embodiment, the first coupling part 47 may be provided at the bottom portion 43a of the coupling part 43.

The concave-convex relationship between the first coupling part 47 and the second coupling part 62 is not limited to that described in the foregoing embodiment. That is, the second coupling part 62 may be a concave part, and the first coupling part 47 may be a convex part fitted into the second coupling part 62. According to this configuration, the first coupling part 47 and the second coupling part 62 can be coupled to each other in a simple manner.

In the foregoing embodiment, the second route regulating member 50 may be provided on either side of the first route regulating member 40 in the length direction. In this case, the covering coupling part 53 is attached to each of the end portions 40a and 40b of the first route regulating member 40 in the length direction.

The covering coupling part 53 and the movement regulating part 91 serving as movement regulating parts cover the outer circumferences of the end portions 40a and 40b of the first route regulating member 40, respectively. However, the present disclosure is not particularly limited to this configuration. The movement regulating parts may be partially provided in the circumferential direction of the first route regulating member 40 as long as they can regulate movement of the second coupling part 62 along the length direction of the first route regulating member 40. In the foregoing embodiment, either one of the movement regulating part 91 and the covering coupling part 53 may not be attached to the first route regulating member 40.

The fixing part 61 in the foregoing embodiment is of a type to be fixed to the bolt B extending from the panel P. However, the present disclosure is not particularly limited to this configuration. The fixing part 61 may be changed to a type to be fixed to a plate-like attachment piece extending from the panel P or a type to be inserted and fixed to a hole formed in the panel P, for example.

The second route regulating member 50 in the foregoing embodiment is formed so as to regulate the route of the bent portion 11B of the wire harness body 11. However, the present disclosure is not limited to this configuration. For example, the second route regulating member 50 may be changed to a shape that regulates the route of the linear portion 11A of the wire harness body 11. In this case, the second route regulating member 50 is changed to a shape in which the bent shape of the body part 51 extends linearly, for example.

The structure of the first route regulating member 40 in the foregoing embodiment can be changed as appropriate. For example, the structure of the first route regulating member 40 is not particularly limited as long as the first route regulating member 40 has the insertion inlet 40X and can be attached to the outer circumference of the outer sheath member 30.

The protrusion part 45 in the foregoing embodiment may be provided at a position distanced from the insertion inlet 40X relative to the leading end of the first end portion 41 in the circumferential direction of the first route regulating member 40.

The protrusion part 46 in the foregoing embodiment may be provided at a position distanced from the insertion inlet 40X relative to the leading end of the second end portion 42 in the circumferential direction of the first route regulating member 40.

The protrusion parts 45 and 46 in the present embodiment may be partially provided in the length direction of the first route regulating member 40.

At least one of the protrusion parts 45 and 46 in the foregoing embodiment may be omitted.

The shape of the coupling part 43 in the first route regulating member 40 in the foregoing embodiment is not limited to an arc shape and may be changed to an elliptic arc shape or a U shape, for example.

In the foregoing embodiment, the first route regulating member 40 and the second route regulating member 50 are harder than the outer sheath member 30. However, the present disclosure is not limited to this configuration. The first route regulating member 40 and the second route regulating member 50 may be as hard as or less hard than the outer sheath member 30. That is, it is sufficient that the first route regulating member 40 and the second route regulating member 50 act such that the wire harness body 11 with the first route regulating member 40 and the second route regulating member 50 is less likely to bend than the wire harness body 11 without the first route regulating member 40 and the second route regulating member 50.

The outer sheath member 30 in the foregoing embodiment may be formed by providing a metal layer including a metallic material on the outer surface of a resin corrugated tube, for example.

The outer sheath member 30 in the foregoing embodiment is not limited to a corrugated tube and may be an outer sheath member without the large-diameter parts 31 and the small-diameter parts 32, for example.

The outer sheath member 30 in the foregoing embodiment may have a slit extending in the length direction of the outer sheath member 30.

In the foregoing embodiment, the electric wires 21 are high-voltage electric wires. However, the present disclosure is not limited to this configuration. For example, the electric wires 21 may be low-voltage electric wires.

In the electric wire member 20 of the foregoing embodiment, an electromagnetic shielding member is embodied as the braided member 25. However, the present disclosure is not limited to this configuration. For example, a metallic foil may be embodied as the electromagnetic shielding member in the electric wire member 20.

The braided member 25 in the electric wire member 20 of the foregoing embodiment may be omitted.

In the foregoing embodiment, the two electric wires 21 constitute the electric wire member 20. However, the present disclosure is not limited to this configuration. The number of electric wires 21 may be one or three or more.

The placement of the inverter M1 and the high-voltage battery M2 in the vehicle V is not limited to that in the foregoing embodiment, and may be changed as appropriate in accordance with the vehicle configuration.

In the embodiment, the plurality of in-vehicle devices electrically connected by the wire harness 10 are embodied as the inverter M1 and the high-voltage battery M2. However, the present disclosure is not limited to this configuration. The plurality of in-vehicle devices electrically connected by the wire harness 10 are not particularly limited as long as they are electric devices installed in the vehicle V.

It should be noted that the embodiment and modification examples disclosed herein are merely examples. The present disclosure is not limited to the exemplifications herein, but rather is indicated by the scope of claims, and is intended to include all modifications within the meaning and scope equivalent to the scope of claims.

What is claimed is:

1. A wire harness comprising:
a wire harness body that includes an electric wire and an outer sheath configured to cover an outer circumference of the electric wire;
a first route regulator that is to be attached to an outer circumference of the outer sheath and is configured to regulate a route of the wire harness body, the first route regulator including a curved wall that curves around the outer circumference of the outer sheath; and
a fixing member configured to fix the first route regulator to an attachment target, wherein:
the first route regulator includes: an insertion inlet that is open in a direction orthogonal to a length direction of the first route regulator and extends over an entire first route regulator in the length direction; and a first coupling that is provided on the curved wall and extends in the length direction along an entire length of the first route regulator, and
the fixing member includes: a fixing part that is to be fixed to the attachment target and a second coupling that is to be coupled to the first coupling, the fixing part and the second coupling being shorter than the first coupling, in the length direction.

2. The wire harness according to claim 1,
wherein one of the first coupling and the second coupling is a concave part, and the other of the first coupling and the second coupling is a convex part that is to be fitted into the concave part.

3. The wire harness according to claim 2, wherein:
a cross-sectional shape of the first route regulator orthogonal to the length direction is uniform over the entire length of the first route regulator in the length direction.

4. The wire harness according to claim 3,
wherein the second coupling is attachable to the first coupling along the length direction from an end of the first coupling in the length direction of the first route regulator.

5. The wire harness according to claim 4, wherein:
the second coupling is coupled to the first coupling so as to be movable in the length direction of the first route regulator, and
a movement regulator configured to regulate movement of the second coupling in the length direction of the first route regulator is attached to at least one of two ends of the first route regulator in the length direction.

6. The wire harness according to claim 5, further comprising
a second route regulator configured to regulate a route of the wire harness body and that is to be attached to the outer circumference of the outer sheath, wherein:
the second route regulator includes a covering coupling that is coupled to an end of the first route regulator in the length direction so as to cover the outer circumference of the end, and
the covering coupling functions as the movement regulator.

7. The wire harness according to claim 6, wherein:
the first route regulator has a linear portion that defines a linear part of the route of the wire harness body, and
the second route regulator has a bent portion that defines a bent part of the route of the wire harness body.

8. The wire harness according to claim 1, further comprising
a covering coupling that is coupled to an end of the first route regulator;
wherein the covering coupling covers a portion of the first coupling and prevents the second coupling from sliding to an end of the first coupling.

9. The wire harness according to claim 1, wherein:
the second coupling comprises two coupling parts adjacent to each other in a circumferential direction of the first route regulator, each coupling part comprising (i) a first extension part that extends away from the adjacent coupling part in the circumferential direction and (ii) a second extension part that extends toward the adjacent coupling part in the circumferential direction, the second extension part being shorter than the first extension part.

10. The wire harness according to claim 9, wherein the first coupling includes a projection that fits between the two coupling parts.

11. The wire harness according to claim 10, wherein the projection has a T shape in cross section.

12. The wire harness according to claim 9, wherein each second extension part includes an inclined surface at a side surface on an inner circumferential side of the second extension part such that the thickness of the second extension part decreases toward the adjacent coupling part.

13. The wire harness according to claim 12, wherein the first coupling includes a projection that fits between the two coupling parts.

14. The wire harness according to claim 13, wherein the projection has a T shape in cross section.

15. A wire harness comprising:
a wire harness body that includes an electric wire and an outer sheath configured to cover an outer circumference of the electric wire;
a first route regulator that is to be attached to an outer circumference of the outer sheath and is configured to regulate a route of the wire harness body; and
a fixing member configured to fix the first route regulator to an attachment target, wherein:
the first route regulator includes: an insertion inlet that is open in a direction orthogonal to a length direction of the first route regulator and extends over an entire first route regulator in the length direction; and a first coupling that is provided on the first route regulator,
the fixing member includes: a fixing part that is to be fixed to the attachment target and a second coupling that is to be coupled to the first coupling, and
the second coupling comprises two coupling parts adjacent to each other in a circumferential direction of the first route regulator, each coupling part comprising (i) a first extension part that extends away from the adjacent coupling part in the circumferential direction and (ii) a second extension part that extends toward the adjacent coupling part in the circumferential direction, the second extension part being shorter than the first extension part.

16. The wire harness according to claim 15, wherein the first coupling includes a projection that fits between the two coupling parts.

17. The wire harness according to claim 16, wherein the projection has a T shape in cross section.

18. The wire harness according to claim 15, wherein each second extension part includes an inclined surface at a side surface on an inner circumferential side of the second extension part such that the thickness of the second extension part decreases toward the adjacent coupling part.

19. The wire harness according to claim 18, wherein the first coupling includes a projection that fits between the two coupling parts.

20. The wire harness according to claim 19, wherein the projection has a T shape in cross section.

* * * * *